United States Patent
Au et al.

(10) Patent No.: US 7,058,199 B1
(45) Date of Patent: Jun. 6, 2006

(54) METHODS AND APPARATUS FOR HIDING DATA IN HALFTONE IMAGES

(75) Inventors: Oscar Chi-Lim Au, Kowloon (HK); Ming Sun Fu, Kowloon (HK)

(73) Assignee: The Hong Kong University of Science and Technology, Kowloon (HK)

(*) Notice: Subject to any disclaimer, the term of this patent is extended or adjusted under 35 U.S.C. 154(b) by 559 days.

(21) Appl. No.: 09/638,014

(22) Filed: Aug. 14, 2000

(51) Int. Cl.
*G06K 9/00* (2006.01)

(52) U.S. Cl. .................. 382/100; 382/140; 382/237; 358/3.06; 358/3.28; 358/534; 380/51

(58) Field of Classification Search ............... 382/100, 382/190, 237, 140; 283/72, 113; 358/3.06, 358/3.28, 534; 380/51; 347/131
See application file for complete search history.

(56) References Cited

U.S. PATENT DOCUMENTS

| | | | |
|---|---|---|---|
| 3,675,948 A | 7/1972 | Wicker | 283/6 |
| 5,315,098 A | 5/1994 | Tow | 235/494 |
| 5,337,361 A | 8/1994 | Wang et al. | 380/51 |
| 5,396,559 A | 3/1995 | McGrew | 380/54 |
| 5,488,664 A | 1/1996 | Shamir | 380/54 |
| 5,734,752 A | 3/1998 | Knox | 382/212 |
| 5,790,703 A | 8/1998 | Wang | 382/212 |
| 6,636,616 B1 * | 10/2003 | Harrington | 382/100 |
| 6,654,501 B1 * | 11/2003 | Acharya et al. | 382/235 |
| 6,690,811 B1 * | 2/2004 | Au et al. | 382/100 |

* cited by examiner

*Primary Examiner*—Andrew W. Johns
*Assistant Examiner*—Patrick Edwards
(74) *Attorney, Agent, or Firm*—Buchanan Ingersoll PC

(57) ABSTRACT

We propose methods for generating a halftone image, in which each pixel takes one of two tone values. The generated image contains hidden data, which is present at data storage pixels chosen using a pseudo-random number generator. In a first case, the data is hidden within an existing halftone image by reversing the tone value at certain of the data storage pixels, and at pixels neighboring the data storage pixels. In a second case, the halftone image is generated from a grey-scale image, and data is hidden during this conversion process.

12 Claims, 12 Drawing Sheets

| 1/32 | 5/32 | 3/32 |
|------|------|------|
| 7/32 |      | 7/32 |
| 3/32 | 5/32 | 1/32 |

Fig. 22

Figure 23A Impulse response at (3,2)

Figure 23B Impulse response at (4,4)

Figure 23C Convolution kernel at (3,3)

Figure 23D Effective kernel at (3,3)

METHODS AND APPARATUS FOR HIDING DATA IN HALFTONE IMAGES

FIELD OF THE INVENTION

The present invention relates to methods and apparatus for producing a halftone image including embedded data, such as data indicating the origin of the image.

BACKGROUND OF THE INVENTION

Nowadays images appear routinely in massively distributed printed matter, such as books, magazines, newspapers, printer outputs and fax documents. Images appear also routinely in widely accessible web pages, and multimedia files on the Internet and in storage media such as CD-ROM and DVD. Associated with the widespread circulation of images are issues of copyright infringement, authentication and privacy, so it is often desirable to include within the images data such as company identity, owner information, creation date and time, for copyright protection and authentication purposes. Such embedded data has been referred to as "watermarking data". The embedded object may for example be an image, a video sequence, an audio clip, a speech file, or a fax document. In the case that the embedded data is an image, the watermark may be visible or invisible, and the present invention is particularly concerned with invisible watermarks.

In many such images, each pixel takes one of many tone values. Such an image with at least three tone values, and normally many more, such as 256 tone values, is here referred to as a multitone image or grey scale image.

Quite a number of watermarking methods are known for natural grey scale images, so it is now possible to hide large amounts of data without suffering a great loss of image quality. For such algorithms, an important issue is the "robustness" of the watermarking, that is how hard it is for a third party to remove the watermark.

However, few, if any, known watermarking algorithms can be applied to "halftone" images—that is images in which each position (pixel) takes one of two values. Halftoning is a method often used to transform multi-tone images (typically with 256 levels) into images with two-tone colors (2 levels). Such methods are used widely in computer printers, newspaper/magazine/book publishing, fax machines, etc. From a distance, halftone images resemble images with multi-tones.

There are two main kinds of halftoning techniques, namely, ordered dithering (see B. E. Bayers, "An Optimum Method for Two Level Rendition of Continuous Tone Pictures," Proc. of IEEE Int. Communication Conf., pp 2611–2615, 1973) and error diffusion (R. W. Floyd, L. Steinberg, "An Adaptive Algorithm for Spatial Greyscale," Proc. SID, pp. 75–77, 1976.). Ordered Dithering is a computationally simple and effective halftoning method, usually adopted in low-end printers. It compares the pixel intensities with some pseudo random threshold patterns or screens in order to determinate its 2-tone output.

Table 1 shows an example of a dithering screen (taken from L. M. Chen, H. M. Hang, "An Adaptive Inverse Halftoning Algorithm", IEEE Trans. on Image Processing, Vol. 6, No. 8, August 1997), which will be used throughout this document. FIG. 4 shows an original 8 bit grey scale image, Lena, of size 512×512 that will be used throughout this paper. FIG. 12 is the halftoned version of Lena produced using ordered dithering.

TABLE 1

"8 × 8 dispersed-dot" dither matrix

| 0  | 32 | 8  | 40 | 2  | 34 | 10 | 42 |
|----|----|----|----|----|----|----|----|
| 48 | 16 | 56 | 24 | 50 | 18 | 58 | 26 |
| 12 | 44 | 4  | 36 | 14 | 46 | 6  | 38 |
| 60 | 28 | 42 | 20 | 62 | 30 | 44 | 22 |
| 3  | 35 | 11 | 43 | 1  | 33 | 9  | 41 |
| 51 | 19 | 59 | 27 | 49 | 17 | 57 | 25 |
| 15 | 47 | 7  | 39 | 13 | 45 | 5  | 37 |
| 63 | 31 | 45 | 23 | 61 | 29 | 43 | 21 |

Error diffusion is an advanced technique usually used in high-end printers. It is more complicated than ordered dithering, but it can generate halftone images with higher visual quality. It is a single pass algorithm. In error diffusion, the halftoning output is obtained by comparing the image pixels with a fixed threshold. However, the halftoning error is fed back to its adjacent neighbors so that each image pixel has effectively an adaptive threshold. The error feedback helps to maintain approximately equal local intensity average between the original multi-tone images and the corresponding halftone images. An essential component of error diffusion is its error feedback kernel. Different kernels can have quite different behavior. Two commonly used error feedback kernels are used in this article. They are the Jarvis kernel and the Steinberg kernel shown in Tables 2 and 3.

For illustration, halftoned images of "Lena" processed with the Jarvis and Steinberg kernels are shown in FIG. 16 and FIG. 5 respectively. The Jarvis kernel has a large support and tends to give halftone images with high contrast and coarse texture. The Steinberg kernel has smaller support and gives halftone images with fine texture and good contrast. In each case, each element of tables 2 and 3 refers to a respective pixel. The element with an entry marked "x" refers to the pixel currently being processed. Each numerical entry shows the weighting of the effect on the pixel presently being processed from the error caused by halftoning in the pixel with the numerical entry.

TABLE 2

The Jarvis kernel

| 1 | 3 | 5 | 3 | 1 |
|---|---|---|---|---|
| 3 | 5 | 7 | 5 | 3 |
| 5 | 7 | X |   |   |

TABLE 3

The Steinberg kernel

| 1 | 3 | 5 |
| 7 | X |   |

It is well known that most image processing techniques such as filtering or resizing cannot be applied to a halftone image to produce another halftone image with good visual quality. Watermarking is not an exception. Most, if not all, existing watermarking schemes for natural images cannot be applied to halftone images due to the special characteristics of halftone images. Halftone images contain only two tones and have large amount of high frequency noise resulting in very little intensity redundancy. The halftone image pixels take on only two possible values, typically 0 and 255 (or black and white). Most existing watermarking schemes for natural images would generate images that require 8 bits to represent and will take on values other than 0 and 255.

However, there are some existing techniques for halftone image watermarking. It is known to use two different dithering matrices for the halftone generation (see Z. Baharav, D. Shaked, "Watermarking of Dither Halftoned Images", Proc. of SPIE Security and Watermarking of Multimedia Contents, pp. 307–313, January 1999) such that the different statistical properties due to the two dithering matrices can be detected in the future. It is also known to use stochastic screen patterns (see K. T. Knox, "Digital. Watermarking Using Stochastic Screen Patterns", U.S. Pat. No. 5,734,752) and conjugate halftone screens (see S. G. Wang, "Digital Watermarking Using Conjugate Halftone Screens", U.S. Pat. No. 5,790,703) in which two screens are used to form two halftone images and the data is embedded through the correlations between two screens. The embedded pattern can be viewed when the two halftone images are overlaid. It is further known to embed some data in the angular orientation of circularly asymmetric halftone dot patterns that are written into the halftone cells of digital halftone images (see R. T. Tow, "Methods and Means for Embedding Machine Readable Digital Data in Halftone Images", U.S. Pat. No. 5,315,098).

As most halftone images are printed on paper, there are few possible digital attacks on the watermarked halftone images, even though there can be many physical attacks on the paper on which the images are printed. For this reason, rather than robustness, the data hiding capacity and the image quality are much more important issues for watermarking halftone images than for grey-tone images. One common characteristic of the above known watermarking methods is that they cannot embed a large amount of data in a halftone image without significant perceptual distortion.

SUMMARY OF THE INVENTION

The present invention seeks to provide new and useful methods and devices for embedding information in halftone images.

An object of the present invention is to provide techniques to hide a larger amount of data in halftone images than is possible by the above techniques, without causing unacceptable degradation in visual quality.

In a first aspect of the invention, we address a situation in which a first halftone image is available, but the original multi-tone image which produced it is not known, nor the method of halftoning which produced it. In this case, the data-hiding algorithm of the present invention can only operate on the first halftone image.

Specifically, in a first aspect of the invention we propose that hidden data is added at data storage pixels in the first halftone image. The data storage pixels are chosen using a pseudo-random number generator based on a seed value, so that when it is desired to extract the hidden data, the data storage pixels can be found using the seed. Each binary digit of the data to be hidden corresponds to one of the two tone values. At data storage pixels of the existing halftone image at which the tone differs from the corresponding binary digit of the data to be hidden, the tone of the pixel of the existing image is reversed.

The present inventors have found that this process alone (referred to below as "data hiding by self-toggling" or "DHST") may cause unacceptable distortion to the existing halftone image when the level of data is high. To address this, the first aspect of the invention further proposes that to compensate, in the case of data storage pixels for which the first image has a different tone value than the data to be stored, if a predefined neighbourhood of the data storage pixel in the first halftone image contains at least one pixel having the opposite tone value to that of the data storage pixel of the first image, the tone value of one of these neighbouring pixels is also reversed. The neighbourhood may be rectangular in shape with a size of 3×3, 3×5, 5×3, 5×5, etc, or may simply be of any shape, If no candidate is found, the pair toggling will be skipped.

In some embodiments of the first aspect of the invention, if the predefined neighbourhood of the data storage pixel in the halftone image contains a plurality of pixels having the opposite tone value to that of the data storage pixel, one of these neighbouring pixels is chosen at random and its tone is reversed. Such embodiments are referred to herein as "data hiding by pair toggling" or "DHPT".

Preferably, however, a selection is made from these neighbouring pixels according to a criterion, and the tone value of the selected pixel reversed. Such embodiments are here referred to as "data hiding by smart pair toggling" or "DHSPT". The criterion may be based on the similarity of the selected pixel to its neighbouring pixels, e.g. such that the one selected is the one which, when toggled, would create the smallest connected region of the toggled tone. As a result of this pair toggling, one pixel is changed from white to black while another one is changed from black to white, thus preserving the local average intensity.

In a second aspect of the invention, we address a situation in which the original multi-tone image is available. In this second aspect we propose that the halftone image is generated from a multi-tone image. Bits of the data to be hidden are associated with respective ones of the two binary tone values. Data storage pixels are selected by a pseudo-random process, and the tone values at those pixels are fixed at the values associated with the data to be hidden. The consequent errors are then absorbed during an error diffusion process which is used to convert the remainder of the image into two-tone values. This absorption may be causal (that is, as the error diffusion process sweeps across the image, it is passed only to pixels in advance of the data storage process), however, more preferably it is at least partially non-causal.

Although the invention has been explained above in relation to fixing the data to be hidden bit by bit, with each bit being hidden at a respective data storage pixel, the invention, particularly in its second aspect, is not limited in this respect. Specifically, once a data storage point is chosen, the halftone values in a region (that is an area having a plurality of pixels, specifically a number L) determined by a pseudo-random algorithm may all be determined by more than one binary digit of the data to be hidden. For example, suppose that the region includes L pixels. Then, there are $2^L$ halftone values which the pixels of that region may take, so up to L bits of the data to be hidden can be stored in a region determined by a single pseudo-randomly chosen pixel. Specifically, a portion of the data to be hidden including up to L bits can be represented by a mapping between the possible states of this portion of the data to be hidden and the states of the tone values of the L pixels of the region, and this mapping need not be one-to-one, but many include a certain level of redundancy, i.e. a single possible state of the portion of data to be hidden may be mapped to one of a plurality of different tone combinations of the L pixels.

The error caused by setting the tone values of the L pixels can be diffused to other neighbouring pixels (as in the second aspect) or be compensated for by complementary toggling (as in the first aspect). Clearly, this possibility reduces to the one explained in the preceding paragraphs in the case that L=1. Note that the region may be of any shape, and need not be symmetric (e.g. rectangular). In particular, it may be a 3×3, 3×5, 5×3, 5×5 rectangular region. It may alternatively be in the shape of an 'X' or a '+'.

In either aspect of the invention, the data to be hidden may have been pre-processed, in any arbitrary order, before it is embedded in the first image as explained above, by one or more invertible operations, such as re-ordering, padding, scrambling, encryption, transformation, source coding or compression, error correction/control coding, etc. We will use the term 'the data to be embedded' here to mean the pre-processed version of the data to be hidden. When the embedded data is read out or recovered, the inverse of each of the operations applied during the pre-processing is applied in reverse order to recover the original data.

BRIEF DESCRIPTION OF THE FIGURES

Embodiments of the figures will now be described, for the sake of example only, with reference to the accompanying figures, in which:

FIG. 22 shows the effective kernel of the error diffused from a data storage pixel in a MDHED method according to the invention; and FIGS. 23A to 23D respectively show the convolution kernel at (3,2), the convolution kernel at (4,4), the convolution kernel at (3,3) and the effective kernel at (3,3) in an example of the method of FIG. 22.

DETAILED DESCRIPTION OF EMBODIMENTS

1. Data Hiding without the original Multi-tone Image

In this section, we focus on the situation in which a first halftone image is available, but both the original multi-tone image from which it was produced and the halftoning method used to produce it are not known. In this situation, we can only hide data in the halftone image by modifying it in such a way that the visual quality is least degraded. For this problem, we will propose the Data Hiding Smart Pair Toggling (DHSPT). To introduce DHSPT, we will mention two other new intermediate algorithms, the Data Hiding Self Toggling (DHST) and Data Hiding Pair Toggling (DHPT). We will point out that DHST is simple but has major visual artifacts due to the self-toggling and the resulting undesirable local pixel intensity change. The DHPT improves on DHST by using complementary pair toggling instead of self-toggling so as to preserve the local average pixel intensity. However, DHPT still has some significant artifacts due to the formation of large clusters. In turn, the DHSPT improves on DHPT by using a smart way to choose the candidate for pair toggling so as to minimize the size of clusters formed during the pair toggling.

1.1 Data Hiding Self Toggling (DHST)

Figure 1:
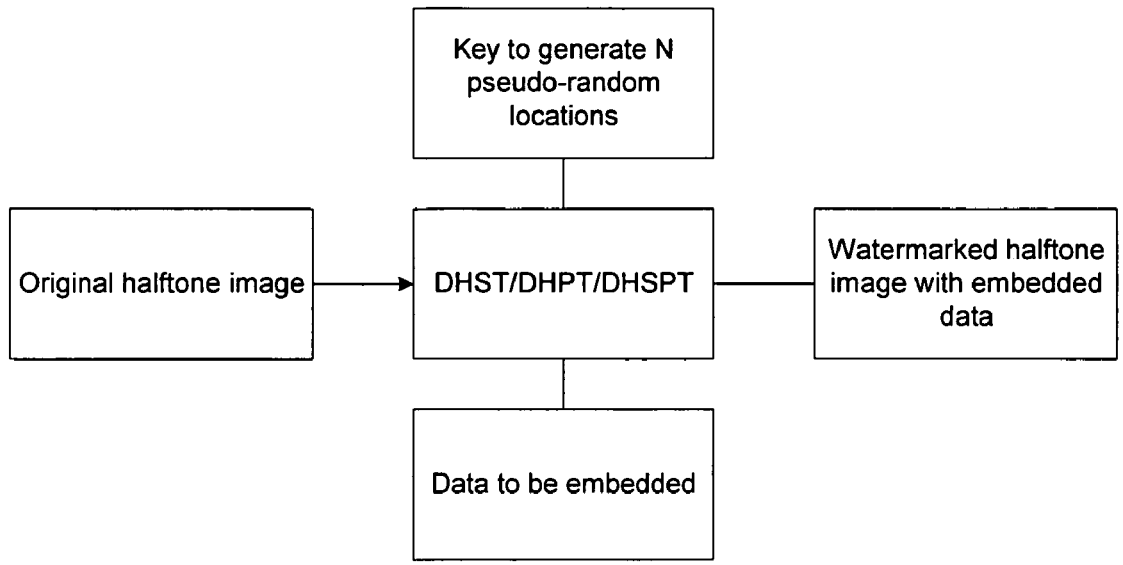
FIG. 1 shows steps in a method according to the first aspect of the invention.
Figure 2:
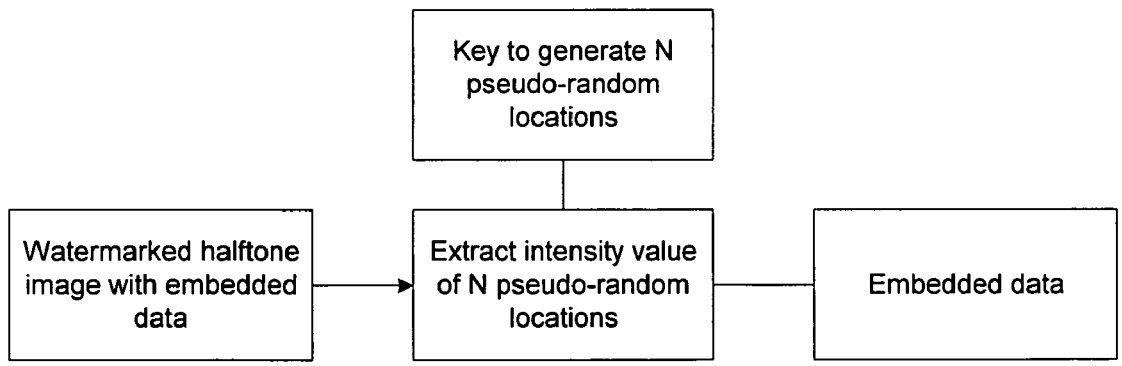
FIG. 2 shows a method of extracting embedded information from a halftone image prepared according to any aspect of the invention.

The block diagram of data hiding using DHST is shown in FIG. 1. The block diagram of the corresponding data extraction is shown in FIG. 2. Actually the block diagrams are applicable to all the proposed algorithms in this document. The number of bits of the data to be hidden is referred to as N. In Data Hiding Self Toggling (DHST), a pseudo-random number generator with a known seed is used to determine a set of N pseudo-random pixels within the image. The seed may or may not be dependent on the halftone image content. The seed will be needed for recovering the embedded data. Then one bit of the embedded data is hidden at each of the pseudo-random pixels by forcing the pixel to be either 0 or 255 according to the data bit to be embedded. Both positive logic (using 0 for logic 0 and 255 for logic 1) and negative logic (using 0 for logic 1 and 255 for logic 0) can be used, and the same logic will be used throughout DHST. We assume that the embedded data bit and the original halftone image pixel are statistically independent and that the embedded data bit is equally likely to be 0 or 1. Then, with a probability of 0.5, the original halftone image pixel value is the desired value and thus no change is needed. And with a probability of 0.5, the original pixel is opposite to that of the desired value in which case the pixel needs to be toggled. We call this self toggling because only one pixel is toggled. Such self toggling allows the hiding of one bit in that pixel. To read the embedded data, one simply uses the same random number generator and the same known seed to obtain the pseudo-random pixels. Then the embedded data bits at those pixels can be read out or recovered easily with the same (positive or negative) logic used.

The exact data hiding self toggling (DHST) algorithm is

1. Select N data storage pixels using a pseudo-random algorithm and a known seed.

2. For each data storage pixel, the halftone value of the second image is set according to a respective data bit to be embedded. In other words, if the original halftone pixel value matches the embedded data bit, do nothing. Otherwise, toggle the pixel.

One advantage of DHST is that it is extremely simple with a very low computational requirement. Another advantage is that the amount of embedded data can be controlled easily by adjusting the number, N, of pseudo-randomly chosen pixels. Actually, the N pixels can be image dependent to yield higher image quality. However, image-dependent pseudo-random pixels limit the freedom of the key and make the control more complicated. For the sake of simplicity, the same set of N image independent pseudo-randomly chosen pixels is used for all images within this document.

Figure 4:
FIG. 4 shows the original multi-tone 'Lena' (512×512)
Figure 5:
FIG. 5 shows the error-diffused 'Lena' produced by the Steinberg kernel.
Figure 6:
FIG. 6 shows the effect of embedding 4096 bits by the DHST algorithm applied to the image of FIG. 5.

One major disadvantage of DHST is low visual quality. To illustrate this, we perform simulation using the 512×512 image 'Lena' shown in FIG. 4. In FIG. 5, 'Lena' is halftoned by error diffusion with the Steinberg kernel in Table 3. In FIG. 6, DHST is applied to hide one bit within every 8×8 block using an image independent pseudo-random algorithm. As there are 4096 (=512*512/8/8) 8×8 blocks in the 512×512 image, there are a total of 4096 bits hidden. About 1.5% of all pixels have data embedded in them, which is a large percentage. This percentage is intentionally set to be large to show the possible visual degradation when the data hiding procedure is pushed close to the limit. In real applications, the percentage should probably be set to be smaller to get better visual quality.

In FIG. 6, DHST generates many unpleasant clusters of pixels that resemble 'salt-and-pepper' noise, some white and some black. Usually 'salt-and-pepper' noise has only black pixels. Here there are both black 'salt-and-pepper' noise and white 'salt-and-pepper' noise. These patches are formed due to the self toggling at the pseudo-random pixels regardless of the local image content. When a pixel is forced to toggle at the pseudo-random pixels in DHST, the local average pixel intensity can be severely distorted resulting in the black and white patches. As an example, in the mid-grey areas (with local intensity being about 128), the original halftone pixels usually form checkerboard patterns with alternating black and white pixels. So a pixel may be a white pixel surrounded by four black pixels. If self toggling is applied, a relatively large cluster of five connected black pixels will be formed. Such larger clusters are perceptually very disturbing.

Figure 11A:
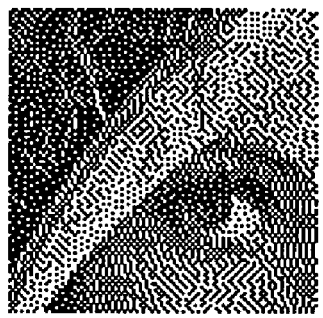
FIGS. 11 to 11F show respectively an enlargement of an eye portion of FIG. 5 (the Steinberg Kernel), FIG. 9 (data embedded by DHED), FIG. 10 (data embedded by MDHED), FIG. 6 (data embedded by DHST), FIG. 7 (data embedded by DHPT) and FIG. 8 (data embedded by DHSPT).
Figure 11B:
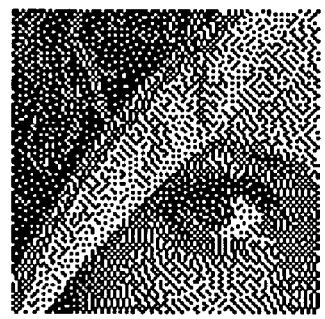
Figure 11C:
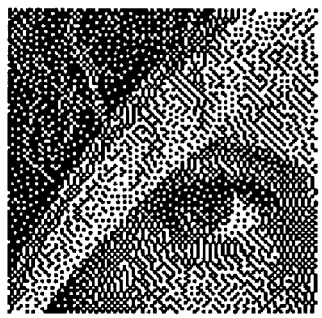
Figure 11D:
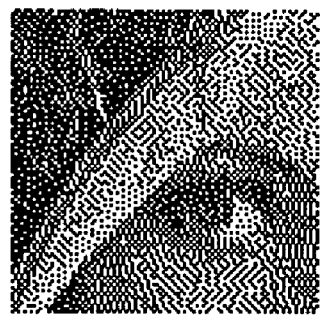

FIGS. 11A and 11D respectively show an enlarged eye portion of FIG. 5 and FIG. 6. From them, we can understand the formation of 'salt-and-pepper' noise in DHST. For a pleasant halftone image, black and white dots are well scattered. For example, the top-left region of FIG. 11A is a dark region before DHST. The black dots are naturally connected together, but the white dots are seldom connected together due to the error diffusion process. Similarly, the bright region at the top-right region has connected white pixels but isolated black pixels. However, after DHST, some pixels are forced to self toggle, regardless of the pattern of the original halftone image. As a result, a cluster of 8 black pixels is combined with a cluster of 3 black pixels by the self toggling to form a large cluster of 12 pixels at the top-center region. Also a cluster of 4 black pixels is joined with two isolated black pixels by self toggling to form a large cluster of 7 pixels. Many small clusters of 3 or 4 black pixels are formed at the right-top region as well. Clusters as small as 3 or 4 pixels can appear as 'salt-and-pepper' noise when viewed from a distance and are annoying. There are basically two kinds of important distortion associated with DHST:

1. Local Average Distortion. The forced self toggling changes the local average intensity seriously. This kind of signal distortion can be measured quantitatively.

2. Clustering Distortion. Some pixels are wrongly grouped together to form visual disturbing clusters. This is more subjective and is hard to measure quantitatively.

The two problems are related but not the same. Usually, larger local average distortion implies more and larger clusters. However, clustering distortion can be large even when local average distortion is small.

1.2 Data Hiding Pair Toggling (DHPT)

Here we propose an algorithm, the Data Hiding Pair Toggling (DHPT), to improve on the DHST. The block diagrams in FIG. 1 and FIG. 2 still apply. The major problem of DHST is the abrupt change of average local intensity due to the forced self toggling. Instead of performing only one forced toggling, we perform a pair of complementary forced toggling to solve the problem of local average distortion. For example, when a black pixel is required to self toggle from black to white, a neighboring white pixel is chosen randomly to self toggled from white to black at the same time. Although two errors are introduced instead of one, the two complementary errors (one positive and one negative) tend to mask out each other. In particular, with the complementary pair toggling, the local average intensity can be preserved and this should give much better visual quality than DHST. If there are M white pixels in the 3×3 neighborhood, one of the M white pixels is chosen randomly. In the special case that M equals zero (i.e. all pixels within the 3×3 neighborhood are black), no complementary toggling is performed. In other words, in this special case, only one self toggling is performed. This is a very rare case occurring only when the local image content is completely black or completely white. It occurs at only two out of the 4096 pseudo-random pixels (<0.1%) used in our 512×512 'Lena'.

The exact algorithm of data hiding by pair toggling (DHPT) is

1. Select N data storage pixels using a pseudo-random algorithm and a known seed. The data storage pixels are referred to as master pixels.

2. For each data storage pixel, if the pixel matches the embedded data bit, do nothing.

3. If the master pixel does not match the embedded data bit, the M complementary neighbors in the neighborhood of the master pixel are identified. One of them is chosen at random. The chosen pixel is called the slave pixel. Both the master and the slave pixels are toggled.

The complexity of DHPT is slightly larger than DHST mainly due to the complexity of the complementary toggling that is performed at approximately half of the data storage pixels.

Figure 7:
FIG. 7 shows the effect of embedding 4096 bits by the DHPT algorithm applied to the image of FIG. 5.
Figure 11E:
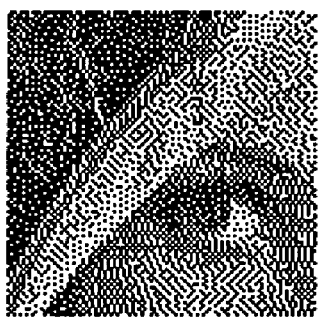

With the complementary toggling, the DHPT has significantly improved visual quality over DHST. To illustrate this, DHPT is applied in FIG. 7 to the halftone images of the 512×512 'Lena'. Again one bit of information is hidden in every 8×8 blocks such that there are a total of 4096 bits (or 1.526%) hidden. FIG. 11E shows the enlarged eye of 'Lena' after DHPT. Compared with the corresponding DHST image, the DHPT image has considerably improved visual quality, with fewer 'salt-and-pepper' artifacts.

1.3 Data Hiding by Smart Pair Toggling (DHSPT)

DHPT can solve the problem of local average distortion effectively leading to lower clustering distortion. Yet the clustering distortion can still be rather significant. The random pair toggling of DHPT can still create large perceptually disturbing clusters or 'salt-and-pepper' noise though the local average intensity is preserved. We now propose a smart pair toggling that minimizes the chance of forming larger clusters. The proposed Data Hiding Smart Pair Toggling (DHSPT) is a method to perform pair toggling that minimizes the size of the resulting clusters and thus suppresses the formation of 'salt-and-pepper' noise.

Essentially, the DHSPT algorithm is the same as DHPT except that the choice of the slave pixel is not random as in DHPT. For DHSPT, the slave pixel is chosen to minimize the after-toggling 'connection' of the slave pixel and the master pixel. Equivalently, the slave pixel is chosen to maximize the before-toggling 'connection'. In general, the number of connection of a pixel is a function of the number of adjacent pixels with the same color (tone) as the pixel. It is defined as follows.

Consider a pixel at (m,n) and its neighbors in a 3×3 neighborhood. Let the nine pixels in the 3×3 neighborhood be $[x_1\ x_2\ x_3;\ x_4\ x_5\ x_6;\ x_7\ x_8\ x_9]$ in Matlab notation with $x_5$ being the pixel at (m,n). The connection con(m,n) of the pixel at location (m,n) is defined as $$con(m, n) = \sum_{i=1}^{9} w(i) f(x_5, x_i),\ f(x, y) = \begin{cases} 1 & x = y \\ 0 & x \neq y \end{cases},$$

where $\omega(i)=1$ for $i=1, 3, 7, 9$, $\omega(i)=2$ for $i=2, 4, 6, 8$, and $\omega(5)=0$. A larger weight is given to the immediate left, right, above and below pixels because they are closer to the center pixel and are more significant when it has the same color as $x_5$. The con is a measure of how connected the pixel at (m,n) is with neighbouring pixels of the same tone. As con(m,n) is evaluated only for the slave pixel candidates that have different values from the master pixel, the contribution of the master pixel is zero. The con is conjugated after a pixel is self toggled.

$$con_{after} = 12 - con_{before}$$

For example, when the master pixel is black, the con of its adjacent white pixels is evaluated. The one with the largest con is chosen to be the slave pixel to perform toggling. After the toggling, the white slave pixel becomes black and its con is the minimum after toggling. It is least connected with black pixels and has the smallest probability of forming a large black cluster. For the master pixel, since it is fixed, the freedom is limited. In order to minimize the con of the master pixel after toggling, if there are more than one adjacent pixel with the same minimum after-toggle con, horizontal or vertical slave neighbors are preferred over diagonal neighbors.

Figure 8:
FIG. 8 shows the effect of embedding 4096 bits by the DHSPT algorithm applied to the image of FIG. 5.
Figure 11F:
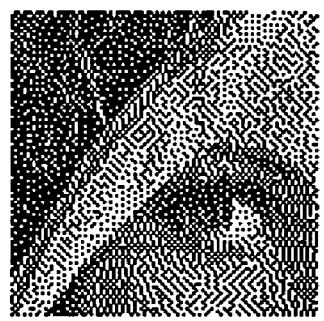
Figure 12:
FIG. 12 shows the image of FIG. 4 converted to a halftone image by ordered dithering.
Figure 13:
FIG. 13 shows the image of FIG. 12 after 4096 bits are embedded using DHST.
Figure 14:
FIG. 14 shows the image of FIG. 12 after 4096 bits are embedded using DHPT.
Figure 15:
FIG. 15 shows the image of FIG. 12 after 4096 bits are embedded using DHSPT.
Figure 16:
FIG. 16 shows the error-diffused 'Lena' produced by the Jarvis kernel.
Figure 17:
FIG. 17 shows the effect of embedding 4096 bits by the DHST algorithm applied to the image of FIG. 16.
Figure 18:
FIG. 18 shows the effect of embedding 4096 bits by the DHPT algorithm applied to the image of FIG. 16.
Figure 19:
FIG. 19 shows the effect of embedding 4096 bits by the DHSPT algorithm applied to the image of FIG. 16.
Figure 20:
FIG. 20 shows the effect of embedding 4096 bits in the image of FIG. 4 by the DHED algorithm employing the Jarvis algorithm.
Figure 21:
FIG. 21 shows the effect of embedding 4096 bits in the image of FIG. 4 by the MDHED algorithm employing the Jarvis algorithm.

FIG. 8 shows the Steinberg-kernel error-diffused 'Lena' with 4096 bits hidden by DHSPT. FIG. 11F shows the corresponding enlarged eye portion. It shows that the 'salt-and-pepper' artifacts of DHST and DHPT are mostly suppressed in DHSPT.

2. Data Hiding with Original Multi-tone Image

In the previous situation, only the halftone image is available for data hiding but not the original multi-tone image nor the halftoning method. While DHSPT yields good visual quality, there is still observable degradation due to the remaining 'salt-and-pepper' artifacts, especially in the highly regular patterns in the mid-grey smooth regions in the Steinberg-kernel error-diffused image. If the original image and the halftoning method are available, we should be able to do better than DHSPT. Here we focus on the situation in which the original image is available and the halftoning method is error diffusion. This is a likely situation in high-end printers. We propose a method according to the invention called Modified Data Hiding Error Diffusion (MDHED) to integrate the data hiding operation into the error diffusion operation to obtain improved visual quality. We also introduce an intermediate method according to the invention called Data Hiding Error Diffusion (DHED). Both DHED and MDHED are only slightly more complicated than the regular error diffusion in terms of computational complexity. Both methods are closely related to DHST.

When forced toggling is performed at the pseudo-randomly chosen pixels in DHST, the errors are not compensated in any way and thus the visual quality of DHST is bad. The DHPT and DHSPT improve the visual quality of DHST by finding adjacent complementary pixels to perform pair toggling so as to preserve the local average intensity and to suppress the formation of large clusters. The resulting visual quality of DHPT and DHSPT is significantly better than DHST. However, if the original multi-tone image is available and the halftoning method is error diffusion, the error due to the forced toggling can actually be diffused to many, instead of one, neighboring pixels to obtain even better visual quality.

2.1 Data Hiding Error Diffusion (DHED)

Again the block diagrams in FIG. 1 and FIG. 2 apply. In the proposed DHED, a data hiding step is first applied followed by the regular error diffusion. This step is computationally equivalent to DHST. In other words, data storage pixels are generated using a random number generator with a known seed. Then one bit of the embedded data is hidden at each of the data storage pixels by self toggling if necessary. As in DHST, approximately 50% of the pixels are expected to be toggled. To read the embedded data, one simply uses the same random number generator and the same seed to obtain the pseudo-random pixels. Then the embedded data bits at those pixels can be read out easily. After the data hiding step, error diffusion is applied to the rest of the pixels. In error diffusion, each pixel is compared with a threshold. When it is above the threshold, the output pixel value is 255. Otherwise, the output is 0. The error due to this thresholding is stored and then fed forward to future pixels using the error diffusion kernel. This process changes the thresholds for future pixels. In DHED, error diffusion is not applied to the data storage pixels already processed by DHST. But the error due to DHST at the pseudo-random pixels are stored and are fed forward to future pixels with the rest of the error pixel values using the same error diffusion kernel.

In regular error diffusion, at each pixel location (i, j), a value f(i, j) related to the current pixel value x(i, j) is compared with a threshold T (T=128). The output y(i, j) will be 0 if f (i, j)<T and 255 if f (i, j)≧T The error e(i, j) at all pixel locations are fed forward or diffused to the future pixels by a causal kernel. Note that e(i, j) is not the difference of x(i, j) and y(i, j), but the difference of f(i, j) and y(i, j). Suppose the causal kernel is the Steinberg kernel shown in table 3. The value f(i, i) is the sum of the current pixel value x(i, j) and the feed-forward error a(i, j) as follows.

$$a(i, j) = \qquad (1)$$
$$\frac{1}{16}[e(i-1, j-1) + 5e(i-1, j) + 3e(i-1, j+1) + 7e(i, j-1)]$$
$$f(i, j) = x(i, j) + a(i, j)$$
$$e(i, j) = f(i, j) - y(i, j)$$

Let (m,n) be a data storage pixel in DHED at which forced self toggling is applied. The output value y(m,n) is determined by the embedded data rather than the comparison with the threshold T. The a(m,n),f(m,n) and e(m,n) are computed as in (1). In other words, the three equations in (1) are applied to all the pixels in the image.

The exact algorithm of Data Hiding Error Diffusion (DHED) is

1. Select N data storage pixels using the pseudo random key (that is, pseudo random algorithm and seed).
2. For the N data storage pixels, forced self toggling is applied according to the embedded data.
3. For the rest of the image, error diffusion is applied. The errors due to both error diffusion halftoning and forced self toggling are diffused to the neighboring pixels according to the kernel being used.

The complexity of DHED is similar to the regular error diffusion. The same kernel of error diffusion can be used. As the embedded data is independent of the original multi-tone image and the error diffusion procedure, the forced value at any data storage pixel according to the embedded data is the same as the intended error diffusion output with a probability of 0.5.

Actually, even when the original multi-tone image is not available, DHED could still be applied starting with a halftone image, by converting the halftone image into a grey scale image using inverse halftoning (see Z. Xiong, et. al., "Inverse Halftoning Using Wavelets", Proc. of IEEE Int. Conf. on Image Processing, Vol. I, pp 569–572, October 1996) and then applying DHED. In this way, the final halftone image would not suffer from the 'salt-and-pepper' artifacts. However, as inverse halftoning is a lossy process, some details of the images are lost. We performed simulation on this and found that, while the resulting halftone images do not have much 'salt-and-pepper' artifacts, they have substantial loss in contrast compared with the initial halftone images.

2.2 Modified Data Hiding Error Diffusion (MDHED)

DHED can handle the problem of local average distortion well since the error due to self toggling is compensated by the future pixels. It also avoids to a large extent the formation of large clusters. However, one drawback of DHED is that sometimes a 255 is highly favored, but the pixel is forced to be 0 by the self toggling in DHED according to the data to be embedded. This results in a very large error locally. Although the error can be fed forward to the future pixels, the large error magnitude may cause mildly visually disturbing change to the future pixels. We thus introduce some minor modification to DHED to solve the problem. This is called the Modified DHED (MDHED). In MDHED, the DHST remains the same as in DHED. The error is stored for error diffusion initially. Unlike DHED, this error is the difference between the original pixel value and the DHST output value. We modify the error diffusion to become a non-causal operation such that the error is fed not only to the future pixels, but also to the past pixels.

Again let (i, j) be a pseudo-random pixel at which forced self toggling is applied. Then the output value y(i, j) is determined by the embedded data rather than the comparison with the threshold T. We will diffuse the error at (i, j) partly to the past pixels and partly to the future pixels in the M×N neighborhood. Here we present the algorithm for M=N=3, though it can be generalized easily to any M and N. In MDHED, we modify the definition of f(i, j) slightly for the past pixels in the M×N neighborhood. We define $e(i, j)_{guess} = [x(i,j) - y(i,j)]$ of which a portion a, for some $0 \leq a \leq 1$ (for example a=0.5, will be fed forward to future pixels, and the remaining (1−a)e(i, j) to past pixels. We define a feedback kernel

| $C_{11}$ | $C_{12}$ | $C_{13}$ |
|---|---|---|
| $C_{21}$ | | | such that $0 \leq C_{ij} \leq 1$ and $\Sigma C_{ij}=1$. Then for the four past neighbors at (i−1,j−1), (i−1,j), (i−1,j+1), and (i, j−1), we use the same a but modify their f $$f(i-1, j-1)=x(i-1,j-1)+a(i-1, j-1)+C_{11}(1-\alpha)e_{guess}(i,j)$$

$$f(i-1, j)=x(i-1, j)+a(i-1, j)+C_{12}(1-a)e_{guess}(i, j)$$

$$f(i-1, j+1)=x(i-1, j+1)+a(i-1, j+1)+C_{13}(1-a)e_{guess}(i, j)$$

$$f(i,j-1)=x(i,j-1)+a(i,j-1)+C_{21}(1-a)e_{guess}(i, j)$$

and compute the corresponding output Y and error e as in (1). We then compute e(i,j) as $$e(i, j)=f(i, j)-y(i, j)-(1-a)e_{guess}(i, j)=x(i, j)+a(i, j)-y(i, j)-(1-a)e_{guess}(i, j)$$

In other words, $$e(i, j)=ae_{guess}(i, j)+a(i, j)$$

which is the error term to be diffused to future pixels. The diffusion to the future pixels can involve the Steinberg, Jarvis or any other kernel.

To generalize to any M and N, we simply define a feedback kernel of size M×N such that the coefficients sum to unity and modify the definition of f for the past pixels in this M×N neighborhood accordingly.

2.3 Example of Modified Data Hiding by Error Diffusion

In this example, we consider the case of the equations of 2.3 in which α=0.5 and the coefficients $C_{11}, C_{12}, C_{13}, C_{21}$ are respectively 1/16, 5/16, 3/16 and 7/16. We will further assume that the Steinberg kernel is used in the error diffusion to future pixels. This means that the impulse response at a pixel which is one of the data storage pixels is as shown in FIG. 22.

Referring now to FIG. 23A to FIG. 23D, suppose there is embedded data at a data storage pixel (4,4), but at no other location. Error diffusion is applied in a sweep which is from left to right in each row, and in successive rows from top to bottom of the image. FIG. 23A shows as weight values in the solid box the convolution kernel of halftone error in (3,2), that is the effect felt at (3,2) due to diffused errors from past pixels. The effect is zero at the pixels in the solid box which are coloured white, since the error diffusion is causal. Similarly, because of this impulse response, the contribution of the error at (3,2) to the pixel at (3,3) is 7/16 for example, as shown in FIG. 23C.

With data embedded at (4,4), the halftone error at location (4,4) is guessed or estimated by assuming past pixel errors are zero. FIG. 23B shows the normalized kernel of the guessed halftone error $e_{guess}$ at location (4,4). Because of this impulse response, the contribution of the guessed error $e_{guess}$ at (4,4) to the pixel at (3,3) is ⅟₃₂ in FIG. 23C. FIG. 23C shows the resulting convolution kernel of (3,3). As the unhalftoned future pixels are assumed to have zero error, the effective convolution kernel of (3,3) is as shown in FIG. 23D.

It is this algorithm which is used in the simulations in Section 3.

3. Simulation Results and Discussions

The proposed DHSPT is applied to several halftone images generated with ordered dithering and error diffusion. For the sake of comparison, the DHST and DHPT are also simulated. The DHED and MDHED are also applied to the same halftone images generated with error diffusion.

The Peak Signal-to-Noise Ratio (PSNR) is a common measure of merit for many image processing algorithms due to its simplicity. However PSNR does not necessarily reflect the subjective quality of the images. For halftone images, PSNR is not a good measure because good halftone images with good perceptual quality do not have high PSNR due to its binary intensity values of 0 and 255.

Figure 3:
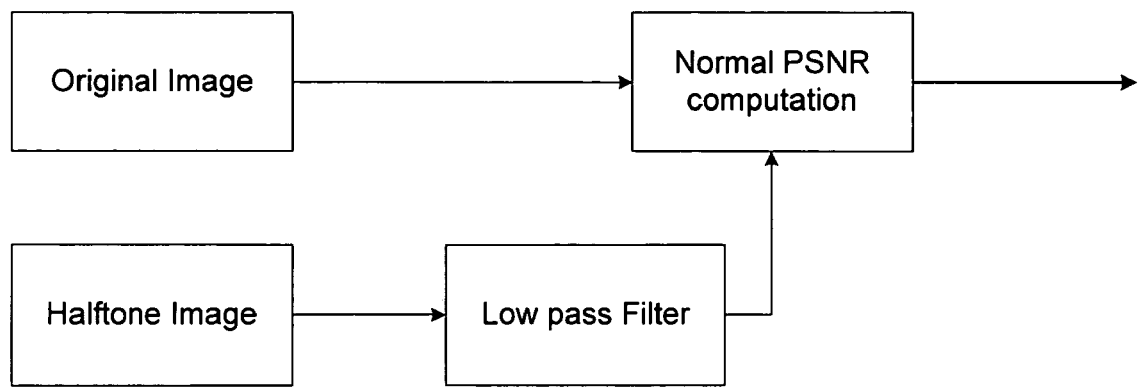
FIG. 3 shows the definition of the MPSNR function discussed below.

In order to quantify the visual quality of halftone images, we propose to use the Modified Peak Signal-to-Noise Ratio (MPSNR), which is basically the PSNR of the original multi-tone image and a lowpass version of the halftone images, as shown in FIG. 3. Notice that the MPSNR used here is only a rough indicator of the image quality and it depends on the low pass filter used. It is not a substitute for subjective evaluation of the halftone images using the human eyes. However, it helps to quantify the local average distortion and clustering distortion to some extent. The MPSNR of halftone images with various halftoning methods and data hiding methods are listed in Table 4, with 4096 bits hidden in all cases at exactly the same pseudo-random pixels. In addition to test image "Lena", four more test images are used, referred to here as "Barbara", "Boat", "Harbor" and "Pepper". In each case, the relative qualities of the algorithms, measured as MPSNR, are broadly similar. They are given in Table 4.

TABLE 4

| MPSNR | | Lena | Barbara | Boat | Harbor | Peppers | Ave. MPSNR |
|---|---|---|---|---|---|---|---|
| Ordered Dither | Original | 27.21 | 22.91 | 25.79 | 23.37 | 26.31 | 25.12 |
| | DHST | 26.46 | 22.62 | 25.30 | 23.01 | 25.75 | 24.63 |
| | DHPT | 26.93 | 22.80 | 25.59 | 23.24 | 26.07 | 24.93 |
| | DHSPT | 26.96 | 22.80 | 25.61 | 23.25 | 26.11 | 24.95 |
| Error Diffused (Jarvis) | Original | 29.76 | 24.25 | 28.00 | 24.38 | 28.82 | 27.04 |
| | DHST | 28.37 | 23.81 | 27.02 | 23.92 | 27.68 | 26.16 |
| | DHPT | 29.13 | 24.06 | 27.58 | 24.18 | 28.33 | 26.66 |
| | DHSPT | 29.25 | 24.08 | 27.64 | 24.20 | 28.40 | 26.71 |
| | DHED | 28.99 | 24.00 | 27.47 | 24.14 | 28.15 | 26.55 |
| | MDHED | 28.86 | 23.96 | 27.39 | 24.10 | 28.08 | 26.48 |
| Error Diffused (Steinberg) | Original | 30.69 | 24.50 | 28.86 | 24.52 | 29.63 | 27.64 |
| | DHST | 28.96 | 24.00 | 27.64 | 24.02 | 28.25 | 26.57 |
| | DHPT | 29.94 | 24.29 | 28.35 | 24.31 | 29.05 | 27.19 |
| | DHSPT | 30.00 | 24.27 | 28.35 | 24.30 | 29.10 | 27.20 |
| | DHED | 30.50 | 24.43 | 28.71 | 24.47 | 29.46 | 27.51 |
| | MDHED | 30.47 | 24.44 | 28.72 | 24.48 | 29.50 | 27.52 |

As expected, all the proposed data hiding algorithms cause a drop in MPSNR. The drop in MPSNR of DHST is about 0.5 dB for ordered dithered images and about 1 dB for error-diffused images. Compared with DHST, the DHPT achieves a gain in MPSNR of about 0.3 dB for ordered dithered images and 0.5 dB to 0.6 dB for error-diffused images. This gain is probably due to the preservation of the local average intensity distortion in DHPT. Compared with DHPT, the DHSPT has similar MPSNR because they both perform pair toggling. However, the DHSPT can yield higher quality due to the strategic choice of the complementary pixels for pair toggling to suppress the formation of visually disturbing clusters. This is not reflected in the MPSNR measure but can be easily detected in subjective viewing. The drop in MPSNR of DHED is about 0.5 dB in the Jarvis-kernel error-diffused images, about 0.1 db to 0.15 dB worse than DHPT and DHSPT. But the visual quality of DHED is actually quite good. The drop in MPSNR of MDHED is about 0.08 dB worse than DHED for the Jarvis kernel. These are because both DHPT and DHSPT perform well for the Jarvis kernel. Nevertheless, the MPSNR of DHED is significantly better than DHPT and DHSPT for the Steinberg kernels, being 0.3 dB higher. The MPSNR of MDHED is similar to that of DHED. However, MDHED can yield higher visual quality than DHED due to the more sophisticated causal error diffusion. This is not reflected in the MPSNR. Considering the MPSNR only, the DHED and MDHED have no advantage over DHPT and DHSPT for the Jarvis kernel, but can be much better for the Steinberg kernel. But MPSNR is not a full description of the image visual quality.

Figure 9:
FIG. 9 shows the effect of embedding 4096 bits in the image of FIG. 4 by the DHED algorithm employing the Steinberg algorithm.
Figure 10:
FIG. 10 shows the effect of embedding 4096 bits in the image of FIG. 4 by the MDHED algorithm employing the Steinberg algorithm.

FIG. 5 shows the 512×512 'Lena' halftoned by error diffusion using the Steinberg kernel in Table 3 without data hiding. The proposed DHST, DHPT, DHSPT, DHED and MDHED are applied to embed 4096 bits of hidden data in FIG. 6 to FIG. 10. The eye portion of 'Lena' is enlarged in FIG. 11A. The 4096 bits of hidden data is a lot of hidden data. This amount is used in the simulation to show the kind of worst case artifacts that would appear when the algorithms are pushed towards the limit of hiding a large amount of data. Existing algorithms tend to hide much less hidden data. In FIGS. 11B to 11F, the 100×100 eye portion contains about 150 hidden bits. There are plenty of small clusters of 3 or 4 pixels of same color connected together in DHST, which appear as 'salt-and-pepper' artifacts in FIG. 6. There are significantly fewer 'salt-and-pepper' clusters in DHPT and very few in DHSPT. The DHED has a few but MDHED has no detectable 'salt-and-pepper' clusters. There are plenty of 'salt-and-pepper' noises in DHST in FIG. 6, considerably fewer in DHPT in FIG. 7, and very few in DHSPT in FIG. 8. The visual quality of DHSPT is good, being much better than DHST and DHPT. The visual quality of DHED in FIG. 9 is similar to DHSPT. While DHSPT has some minor 'salt-and-pepper' artifacts at Lena's shoulder, DHED has some minor 'salt-and-pepper' artifacts at the black strip in the background. There are virtually no 'salt-and-pepper' artifacts in MDHED in FIG. 10. Thus for the Steinberg-kernel error-diffused Lena, MDHED gives the best visual quality. The DHED and DHSPT have similar quality, both better than DHPT which is better than DHST.

The original halftone image of 'Lena' by ordered dithering and those processed by DHST, DHPT, DHSPT are shown in FIG. 12 to FIG. 15. There are 4096 hidden bits. DHED and MDHED are not simulated because they are not applicable to ordered dithered images. Lots of 'salt-and-pepper' artifacts are present in DHST. DHPT shows significantly better visual quality than DHST. For the ordered dithered image, DHSPT gives good image quality, better than DHPT.

The original halftone image of 'Lena' by error diffusion with Jarvis kernel, and those processed by DHST, DHPT, DHSPT, DHED and MDHED are shown in FIG. 16 to FIG. 21. Again 4096 bits are hidden in each image. As before, DHST has a lot of 'salt-and-pepper' artifacts. However, the 'salt-and-pepper' artifacts are not as disturbing as in the ordered dithering and Steinberg-kernel error-diffusion cases due to the masking effect of the coarse texture due to the Jarvis kernel. With this masking effect, DHPT, DHSPT, DHED and MDHED have similar visual quality to the original halftone image. It appears that images halftoned by error diffusion with the Jarvis kernel has enough masking power that any reasonably algorithms can work well. It is more difficult to hide data in images halftoned by error diffusion with Steinberg kernel.

INDUSTRIAL APPLICABILITY

The techniques of the present invention can be applied in printers, especially in the printer driver programs to embed hidden information into printed images. The hidden information can be recovered when the printed halftone image is scanned with high resolution and when the proper watermark detection program is applied. Possible useful hidden information includes the printer serial number, creation date/time/place, author information, company information, intended user information, secret message, image classification and rating information, etc. Such information may be used for authentication, copyright protection, archival indexing, and retrieval keys, etc. It is important to hide data in a way that would not affect significantly the visual quality of the printout. For high-end printers that usually use error diffusion, DHED can be used to get high quality halftone images. For low-end printers that usually use ordered dithering, DHSPT can be used to get good quality halftone images. It is possible to hide a small image within an image, or to hide a large image within multiple images. The secret message can be used for delivering love messages, company messages or even a small program, because the data capacity can be very large. Furthermore, the techniques of the present invention may be applied in photocopiers, since the documents to be copied often contain printed halftone images. Such halftone images can be detected due to their special high frequency characteristics. The proposed watermarking method DHSPT can be applied to hide data when the copy is made. As the original multi-tone image is not available, DHED cannot be applied. Possible useful hidden information are similar to those in the printer applications.

In book/newspaper publishing, the watermarking is useful for copyright protection. Sometimes, some publishing house would illegally scan others' printed images and use them in their publications. This can occur in newspapers and magazines. By embedding hidden information in the printed images, it would become possible to trace the original owner of the image. It is again important that the data hiding does not degrade the visual quality. In this case, DHED can be applied to give the highest possible visual quality.

In fax machines, watermark can be embedded when images are being transmitted by fax. The hidden information can be the fax machine serial number, transmitting time and date, originating location and intended user location, company/owner information, etc. This can be particularly useful when the transmitted document contain computer generated logos which are images.

The invention claimed is:

1. A method of transforming a first image, which is based on an array of pixels and in which each pixel takes one of at least three tone values, into a second image which is based on the array of pixels and in which each pixel takes one of two tone values, the second image including additional data, the method including:
    a first phase comprising the steps of:
    designating a plurality of pixels in said array for storing said additional data, using a random number generator based on a seed; and
    at each of said designated data storage pixels, setting the tone value of the second image according to a respective binary digit of the additional data, and deriving an error value for that designated data storage pixel representing a difference between the tone value of the second image at that data storage pixel and the value of the first image at that data storage pixel;
    and a second phase performed subsequent to said first phase and comprising the steps of:
    setting the tone values of the second image at second pixels, different from said designated data storage pixels, using a predetermined threshold by, for successive given ones of the second pixels along a predetermined path in said data array, performing the steps of:
    (i) using the tone value of the first image at the given second pixel to calculate a diffusion value for that given second pixel,
    (ii) if the diffusion value of the first image at the given second pixel is above the threshold, setting the value of the given second pixel of the second image to a first value and defining an error value for that given second pixel as the difference between the diffusion value and the first value,
    (iii) if the diffusion value of the first image at the given second pixel is below the threshold, setting the value of the given second pixel of the second image to a second value and defining an error value for the given second pixel as the diffusion value,
    wherein said diffusion value is a weighted sum of (i) the tone value of the first image at the given second pixel, (ii) the respective error values of the second pixels in a first neighbourhood of the given second pixel, and (iii) the error values of any designated data storage pixels in a second neighbourhood of the given second pixel.

2. The method of claim 1 in which said first neighbourhood of the given second pixel only includes second pixels which are earlier along said path than the given second pixel.

3. The method of claim 1 in which said second neighbourhood of the given second pixel only includes designated data storage pixels which are earlier along said path than the given second pixel.

4. The method of claim 1 in which said second neighbourhood of the given second pixel includes both designated data storage pixels which are earlier along said path than the given second pixel, and designated data storage pixels which are further along said path than the given second pixel.

5. The method of claim 1 in which the additional data is derived from a data set by at least one invertible operation.

6. The method of claim 5 in which said at least one invertible operation is selected from re-ordering, padding, scrambling, encryption, transformation, source coding or compression, error correction or control coding.

7. The method of claim 1 in which the first image is one component of a multi-component image having a plurality of components.

8. The method of claim 7 in which the multi-component image is selected from an RGB image, a YUV image, or an infrared image.

9. A method of extracting the additional data from the second image prepared according to claim 1, the method including using said pseudo-random number generator and seed, to identify said designated data storage pixels, detecting the tone values of the first image at said designated data storage pixels, and deriving the additional data from the tone values.

10. A computer program product containing computer program instructions readable by a computer and stored on a computer readable medium, to cause the computer to perform a method according to claim 1.

11. A method of transforming a first image, which is based on an array of pixels and in which each pixel takes one of at least three tone values, into a second image which is based on the array of pixels and in which each pixel takes one of two tone values, the second image including additional data, the method including:

designating a plurality of data storage areas in said array using a random number generator based on a seed, each said area comprising at least one pixel;

for each of said designated data storage areas, using a respective portion of the additional data to set the tone value of the second image for each pixel of the designated data storage area, and deriving an error value for each pixel of the designated data storage area, the error value representing a difference between the tone value of the second image at that pixel of the designated data storage area and the value of the first image at that pixel of the designated storage area; and setting the tone values of the second image at second pixels, different from said pixels of the designated storage area, using a predetermined threshold by, for successive given ones of the second pixels along a predetermined path in said data array, performing the steps of:

(i) using the tone value of the first image at the given second pixel to calculate a diffusion value for that given second pixel, (ii) if the diffusion value of the first image at the given second pixel is above the threshold, setting the value of the given second pixel of the second image to a first value and defining an error value for that given second pixel as the difference between the diffusion value and the threshold, (iii) if the diffusion value of the first image at the given second pixel is below the threshold, setting the value of the given second pixel of the second image to a second value and defining an error value for the given second pixel as the diffusion value, wherein said diffusion value is a weighted sum of (i) the value of the first image at the given second pixel, (ii) the respective error values of the second pixels in a first neighbourhood of the given second pixel, and (iii) the error values of any pixels of the designated storage area in a second neighbourhood of the given second pixel.

12. An apparatus for transforming a first image, which is based on an array of pixels and in which each pixel takes one of at least three tone values, into a second image which is based on the array of pixels and in which each pixel takes one of two tone values, the second image including additional data, the apparatus including:

means for designating a plurality of pixels in said array using a random number generator based on a seed;

means for setting, at each of said designated pixels, the tone value of the second image according to a respective binary digit of the additional data, and deriving an error value for that designated pixel representing a difference between the tone value of the second image at that designated pixel and the value of the first image at that designated pixel; and means for setting the tone values of the second image at second pixels, different from said designated pixels, using a predetermined threshold by, for successive given ones of the second pixels along a predetermined path in said data array, performing the steps of:

(i) using the tone value of the first image at the given second pixel to calculate a diffusion value for that given second pixel, (ii) if the diffusion value of the first image at the given second pixel is above the threshold, setting the value of the given second pixel of the second image to a first value and defining an error value for that given second pixel as the difference between the diffusion value and the threshold, (iii) if the diffusion value of the first image at the given second pixel is below the threshold, setting the value of the given second pixel of the second image to a second value and defining an error value for the given second pixel as the diffusion value, wherein said diffusion value is a weighted sum of (i) the tone value of the first image at the given second pixel, (ii) the respective error values of the second pixels in a first neighbourhood of the given second pixel, and (iii) the error values of any designated pixels in a second neighbourhood of the given second pixel.

* * * * *